(12) United States Patent
Ashton

(10) Patent No.: US 6,949,184 B2
(45) Date of Patent: Sep. 27, 2005

(54) ELECTRICAL METAL ION GENERATING DEVICE

(76) Inventor: Thomas E. Ashton, 7660 Glenmont Dr., North Royalton, OH (US) 44133

(*) Notice: Subject to any disclaimer, the term of this patent is extended or adjusted under 35 U.S.C. 154(b) by 20 days.

(21) Appl. No.: 10/174,800

(22) Filed: Jun. 19, 2002

(65) Prior Publication Data
US 2002/0190008 A1 Dec. 19, 2002

Related U.S. Application Data
(60) Provisional application No. 60/299,078, filed on Jun. 19, 2001.

(51) Int. Cl.[7] .................................................. C02F 1/46
(52) U.S. Cl. .................... 210/198.1; 210/232; 210/243; 204/671
(58) Field of Search ................................ 210/192, 748, 210/764, 198.1, 205, 232, 243; 422/186.03; 204/660, 670, 671; 205/742

(56) References Cited

U.S. PATENT DOCUMENTS

| | | | | | |
|---|---|---|---|---|---|
| 3,425,925 A | * | 2/1969 | Fleischman | ............ | 204/196.15 |
| 4,525,272 A | * | 6/1985 | Henson | ...................... | 210/149 |
| 4,936,979 A | * | 6/1990 | Brown | ...................... | 210/85 |
| 5,281,312 A | * | 1/1994 | Woodside | ................... | 210/747 |
| 5,753,100 A | * | 5/1998 | Lumsden | .................... | 205/701 |
| 5,759,383 A | * | 6/1998 | Byles | ........................ | 205/688 |
| 5,833,842 A | * | 11/1998 | Fields | ........................ | 210/85 |
| 6,267,885 B1 | * | 7/2001 | Briggs et al. | ............... | 210/205 |
| 6,533,942 B2 | * | 3/2003 | Steffens et al. | ............. | 210/696 |
| 6,540,888 B2 | * | 4/2003 | Robey et al. | ............ | 204/275.1 |

* cited by examiner

Primary Examiner—Frank M. Lawrence
(74) Attorney, Agent, or Firm—Renner, Kenner, Grieve, Bobak, Taylor & Weber

(57) ABSTRACT

A device for generating metal ions in an electrolyte. The device comprises a bar of metal that is electrically charged as an anode, surrounded by a tube of stainless steel, which is electrically charged as a cathode. The tube is affixed to a plastic housing that is installed in a conduit carrying an electrolyte. The electrical requirements are supplied by converting AC current to DC current supplying the appropriate voltage and amperage to ionize the specific metal being used.

6 Claims, 2 Drawing Sheets

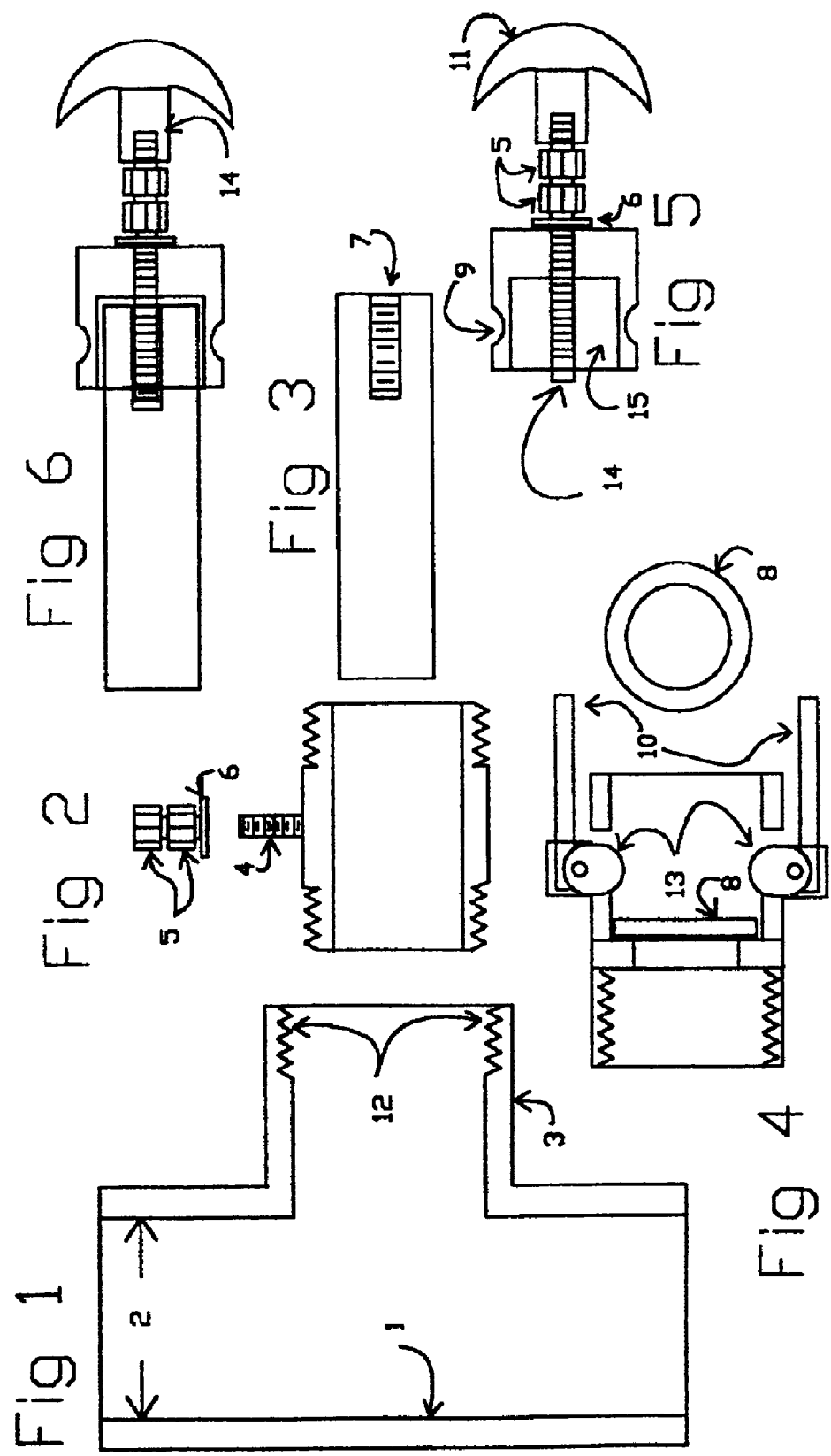

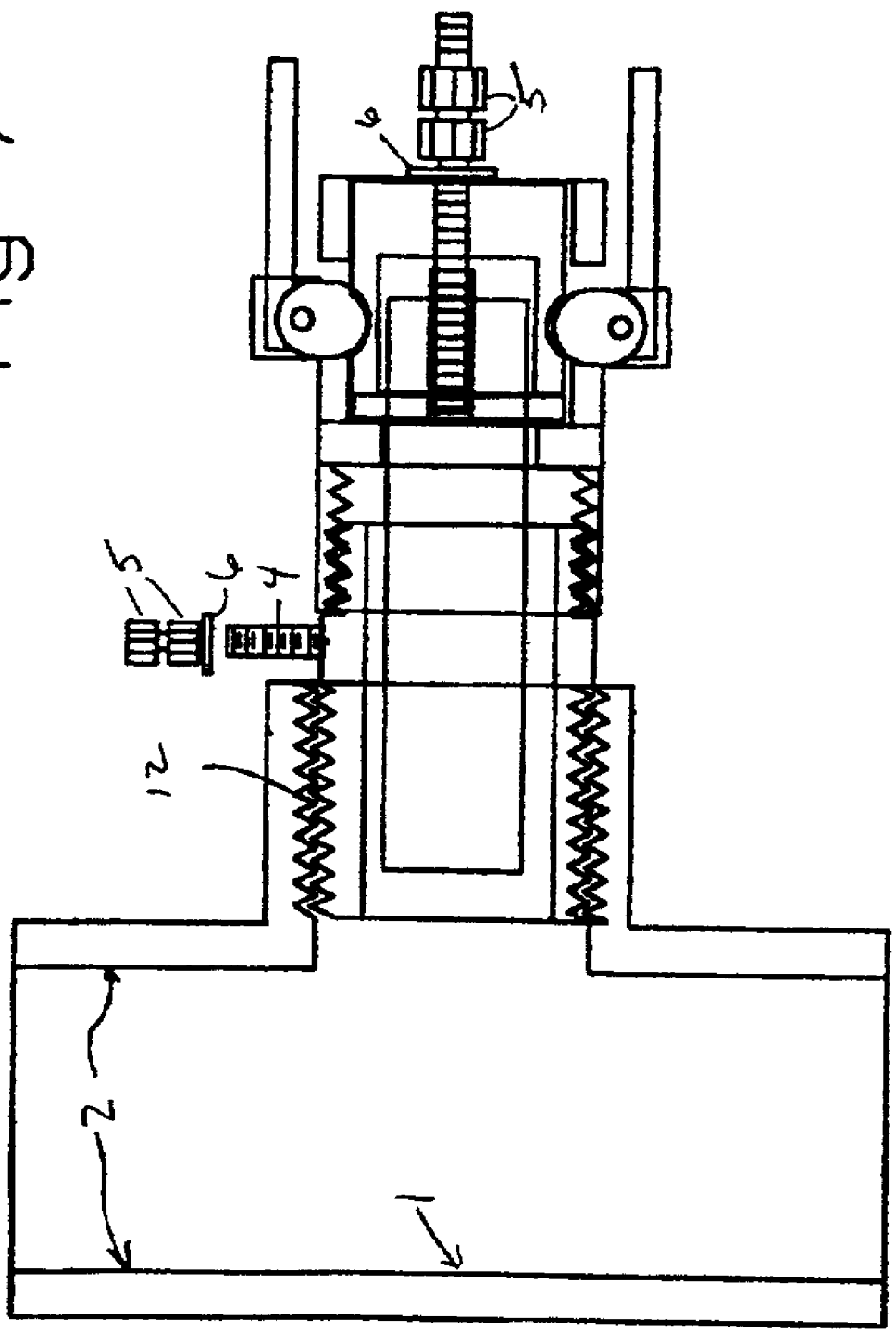

US 6,949,184 B2

ELECTRICAL METAL ION GENERATING DEVICE

This application claims the benefit of U.S. Provisional Application No. 60/299,078, filed Jun. 19, 2001.

TECHNICAL FIELD

The invention herein relates to an electrical device that produces ions of metals by charging a bar of the element that is desired to be ionized with a positive DC electrical voltage (anode) and providing a non corrosive surrounding shell that is of a sufficient distance from the anode to provide a space to receive an electrolyte. The shell is charged with a negative DC electrical voltage (cathode). The anode and the cathode are immersed in an electrolyte so that when the anode and cathode are charged with their respective voltages, ions of the anode are dislodged therefrom and migrate through the electrolyte toward the cathode. Sufficient flow of the electrolyte is maintained through the device to cause a quantity of these ions to be swept away from the cathode and thereby become injected into the flow of the electrolyte.

With certain metal elements in close proximity and charged with opposite polarities, ions of one material become dislodged and migrate through the electrolyte to the other element if sufficient voltage is provided to produce the desired quantity of ions in the desired time.

BACKGROUND OF THE INVENTION

It has long been known that ions of copper will effectively kill unwanted algae and certain other unwanted organisms. It has likewise long been known that ions of silver will effectively kill unwanted bacteria, viruses, germs, and other organisms. Pioneers in the early days of the settlement of America were known to place silver dollars in their water containers to prevent contamination of their water supplies with microorganisms. More recently copper has commonly been used in such applications as coatings for the bottoms of boats to prevent formation of algae. Many other examples illustrate the effectiveness of this phenomenon.

Presently, cooling towers of buildings and the like rely upon large volumes of water flow through heat exchanges. Such water is recycled over long periods of time and, consequently, the water is given to contamination that may be harmful not only to the equipment of the cooling tower, but to public health, as well. The development of scale, algae, Legionella and other biomass materials on the cooling tower structures are most problematic.

There is a need in the art for a device capable of removing contaminants from the water of cooling towers to thus prevent the accumulation of undesired materials within the water and upon the tower equipment.

DISCLOSURE OF THE INVENTION

In light of the forgoing, it is a first aspect of the invention to provide an electrical metal ion generating device for use in the water flow path of cooling towers.

Another aspect of the invention is the provision of an electrical ion generating device capable of controlling biological contaminants from the coolant of cooling towers.

A further aspect of the invention is the provision of an electrical ion generating device capable of precluding the accumulation of algae, Legionella and other biomass within cooling towers.

Yet another aspect of the invention is the provision of an electrical ion generating device for use in cooling tower recirculating systems that is reliable and durable in use, and easy to construct with state of the art elements.

The foregoing and other aspects of the invention are achieved by an ion generating device for fluid treatment, comprising: a fluid conduit having a through flow leg and a diverting leg; an electrically conductive tubular member received in one of said legs; an electrically conductive rod received within one of said legs, said rod and leg defining an annular flow path therebetween; and a first electrical connector connected to said leg and a second electrical connector connected to said rod, said electrical connectors adapted to receive voltages of opposite polarity.

BRIEF DESCRIPTION OF THE DRAWINGS

For a complete understanding of the objects, techniques, and structure of the invention, reference should be made to the following detailed description and accompanying drawings wherein:

FIG. 1 is a cross sectional view of a "T" fitting for a 2" diameter PVC pipe, the short leg being threaded for 2" NPT;

FIG. 2 is an illustrative view in partial cross section of a stainless steel nipple that is used as the cathode;

FIG. 3 is an perspective view of the metal bar that is to be ionized and is used as the anode;

FIG. 4 is an illustrative view in partial cross section of the female component of a "Banjo" quick disconnecting cam lever coupling showing the cam levers for securing the male component in place;

FIG. 5 is an illustrative view in partial cross section of the male component of what is commonly referred to as a "Banjo" quick disconnect cam lever coupling;

FIG. 6 is an illustrative depiction of the assembly of the metal bar to be ionized into the male component of the "Banjo" coupling; and FIG. 7 is an illustrative depiction of the assembly of the components.

DETAILED DESCRIPTION OF THE PREFERRED EMBODIMENT

Referring now to the drawings, an appreciation can be obtained of the structure and operation of the electrical metal ion generating device of the invention.

FIG. 1 shows a cross sectional view of a PVC "T" through which an electrolyte flows and that further houses the assembly of components that comprise the ion generating cell of the invention. The "T" is to be incorporated into an existing system that contains an electrolyte into which the desirable ions are injected. While the invention herein is described with respect to a "T" connector, it will be understood that other diverting couplers, such as a "Y" connector or the like could be used. The long leg 1 of the "T" is preferably 5⅞" long with an ID 2 of 2⅜". The length of the short leg from the OD of the long leg to the open end of the short leg 3 is preferably 1½". The short leg is threaded at 12 for 2" NPT.

FIG. 2 shows a stainless steel nipple assembly that is adapted to be threaded into the female threaded leg 12 of the "T" fitting of FIG. 1. The nipple is preferably 4" long and 1⅞" in diameter with standard NPT threads at each end. There is a stainless steel threaded rod 4 that is 1¼" long by 20 threads to the inch, welded to the nipple in the center and perpendicular thereto. Two nuts, 5¼" by 20, and a washer 6 are threaded to the nipple and provide a place to which the negative electrical terminal may be attached between the nuts.

With reference to FIG. 3, the bar of metal to be ionized is, in the preferred embodiment, 1½" in diameter and 5½" long. An axial bore 7 that is preferably 2" deep by ¼" by 20 threads to the inch is drilled in the center of the metal bar.

The female component of what is commonly referred to as a "Banjo" quick disconnect cam lever coupling is shown in FIG. 4. In a preferred embodiment, the coupling is dimensionally 3" long by 3" diameter. The cams 13 hold the assembly of the bar to be ionized (FIG. 3) and the male component of the "Banjo" coupling (FIG. 5) in place. The rubber washer 8 is shown in position to form a liquid tight seal when the assembly (FIG. 6) is in place.

With reference to FIG. 5, there can be seen the male component of a 2" "Banjo" quick disconnect cam lever coupling. The coupling has a ¼" by 20 threads to the inch axial bore drilled through its center end. A stainless steel threaded rod 14, ¼" by 20 threads to the inch by 2", has a washer 6 and two ¼" by 20 nuts 5 threaded thereto and is further threaded into said "Banjo" coupling as shown. Attached to the rod is a handle 11 threaded thereto. The "Banjo" coupling has a cavity 15 substantially 1¾" in diameter by 1½" deep.

FIG. 6 depicts the assembly of the metal bar of FIG. 3 and the stainless steel threaded rod 14 as threaded through the male component of the "Banjo" coupling (FIG. 5) and into the metal bar. The bar is assembled into the male component of a unit commonly referred to as a "Banjo" quick disconnect (FIG. 5). Again referencing FIG. 5, a handle 11 is threaded to the threaded steel rod 14 to facilitate removal of the male component (FIG. 5) from the female component (FIG. 4) for service. The metal bar of FIG. 3 is positioned in the cavity 15 of the male component (FIG. 5). The bar of FIG. 3 is held in place with a waterproof epoxy glue. The "Banjo" disconnect (FIG. 5) is 2½" diameter by 2⅛" long. There is a groove 9 encircling the coupling with a radius of ½". The groove is configured to receive the locking lugs 13 on the cam levers 10 in the female component of the Banjo coupling (FIG. 4) and to hold the male component (FIG. 5) in position. A rubber washer 8 is placed at the bottom of a cavity in the female component of the "Banjo" coupling (FIG. 4) and used as a waterproof seal between the two male and female components (FIG. 4) and (FIG. 5). The male component of the "Banjo" coupling (FIG. 5) is inserted into the female component of the "Banjo" coupling (FIG. 4) and is held in place by the locking lugs 10 to form an assembly that facilitates the servicing of the metal bar (FIG. 3).

With reference to FIG. 7, an appreciation maybe obtained respecting the assembly of the invention. As shown, the stainless steel nipple (FIG. 2) is threaded into the female component of the "Banjo" disconnect (FIG. 4) and likewise into the long leg of the "T" fitting (FIG. 1) to form a complete assembly that is required to position the metal bar (FIG. 3) that is affixed to the male component of the "Banjo" quick disconnect cam lever coupling (FIG. 5), which ultimately forms assembly (FIG. 6), so that it can function as a sacrificial anode and produce metal ions in an electrolyte solution.

Previous art such as presented in U.S. Pat. No. 5,364,512 provides for a series of electrodes with intersecting planes described as "radial rib elements" spaced so that each rib element is alternately a cathode and an anode. This configuration is expensive to manufacture, has limited service life due to rapid erosion of the electrodes and causes rapid scaling when any rib element is charged as a cathode.

Further, previous ionizers incorporated two bars, normally of metal that are parallel and in close proximity in the electrolyte. The polarity between them is alternated, causing the cathode to form a crust of calcium from water, if it is used as an electrolyte, or other unwanted metal salt ions, preventing the ions from being dislodged from the bar when it is charged as an anode, and migrating toward the cathode. Since the polarities are switched, each bar is both an anode and a cathode alternately. While a bar is a cathode, it will form such encrustations and then not be able to release ions. Thus all previous configurations create a situation where reliable and consistent production of ions is impossible.

Further, by configuring metal bars parallel to each other, as the bars are eroded away by the ionization process, the distance between the bars increases by the sum total of the erosion of both bars. By configuring the metal bar (FIG. 3) inside a tube of stainless steel (FIG. 2) as presented by this invention, the erosion of the metal bar (FIG. 3) allows for the distance between the anode and the cathode, in the same time and at the same erosion rate, to be reduced by the square root of the distance/time of the erosion rate when two bars are set parallel to each other and therefore erode away from each other. This allows for a far more reliable and consistent performance of the ionized process. Additionally, as the distance between the parallel metal bars increases, the production of ions can no longer take place due to the extended distance between the cathode and the anode. This results in not only reduced performance, but also in substantial waste of the metal bars as they are no longer able to electrically erode. By comparison, the configuration of the instant invention allows for the metal anode to be substantially eroded and still be in close proximity to the cathode and able to produce ions.

To illustrate the above, a common embodiment of the method of installing metal bars in parallel would be to have two bars of 1" square and 5" long installed initially ½" apart. As they erode to non-existence, the final distance between them would be the total of both bars, 2" and the initial distance between them, ½", for a total distance between the bars at the end of their existence of 2½". This distance is far too great for the bars to continue to produce the desired ions making the system inefficient and wasteful By comparison, the proposed configuration of an anode of metal inside a tube of stainless steel acting as the cathode allows for complete utilization of the metal with the distance between the anode and the cathode never exceeding ¾". The maximum distance between the anode and the cathode, when configured thusly, still allows for efficient operation and complete utilization of the metal bars.

As presented above, the present invention uses the principals of ionization. For the specific purpose of this invention it can be stated that when opposite electrical charges of sufficient current are introduced to electrically insulate components in an electrolyte, a transfer of ions takes place from the anode to the cathode. When the assembly is installed into a conduit carrying an electrolyte and the current is flowing, the metal bar (FIG. 3) acts as a sacrificial anode giving up ions, and the stainless steel cylinder (FIG. 2) acts as the cathode that attracts these ions. The flow of the electrolyte prevents a portion of the ions from reaching the cathode and are swept into the flow of the electrolyte. This device is designed so that this transfer of ions is controllable and reliable. Further, the design allows for easy cleaning of the components and the ultimate replacement of the sacrificial element.

As will be readily apparent, the ion generating device of the invention diverts a portion of the electrolyte, such as water, through the short leg 3 of the "T" (FIG. 1) where ionization occurs. The remainder flow straight through the long leg 1. The Z paths are intended to be rejoined following ionization. The amount of electrolyte subject to ionization can, of course, be regulated by the relative diameters of the short leg 3 and long leg 1.

Electrical requirements for the invention are supplied by commercially available power supplies that need not be detailed herein. The requirements for the preferred embodiment presented here are 15 VCD at 4 amps. The control of the production of ions is dependent on the specific application for which the invention is used. Since each application may be different, a method of regulating the production of ions is necessary. To control the production of ions a simple duty timer may be incorporated. The on time and the off time is set by this timer to accommodate the requirements of the specific application.

The invention is designed to be used in conjunction with a variety of equipment where the control of algae, bacteria, germs, bio mass, and the like is desirable. Cooling towers use water through various methods to cool water, refrigerants, etc. Swimming pools and spas need to control the above mentioned biological substances. A mixture of water and oil is commonly used as a lubricant for many industrial applications. This oil/water mix develops bacteria that degrades the lubricity of the oil and renders it unusable. Traditional methods to treat these problems have been to use toxic chemicals. Ionizing metals so that they combine with other elements to either inhibit or enhance a reaction is another valuable use of the invention. Many other applications of this useful technology exist. A reliable, controllable effective structure and method for producing desired ions in the correct quantity is the purpose of the invention presented herein.

The invention is designed to be installed in an existing conduit or as a side stream of existing equipment for the purpose of injecting ions into the fluid stream. Commercially available transformers, power packs and duty cycle timers are available to provide necessary power to the invention and need not be detailed herein. This equipment would be installed in an appropriate fashion to provide for the power requirement of the invention.

Thus it can be seen that the objects of the invention have been satisfied by the structure presented and described herein. While in accordance with the patent statutes only the best known and preferred embodiment of the invention has been presented and described in detail, the invention is not limited thereto or thereby. For a complete understanding of the nature and scope of the invention, reference should be made to the following claims.

What is claimed is:

1. An ion generating device for fluid treatment, comprising:
   a fluid conduit having a through flow leg, defining a straight through flow path, and a diverting leg intersecting said through flow path, said through flow leg, said through flow path, and said diverting leg further characterized in that fluid traveling through said through flow leg along said through flow path has less than its entire volume diverted from travel along said through flow path into said diverting leg;
   an electrically conductive tubular member received in said diverting leg;
   an electrically conductive rod received within said diverting leg, said rod and diverting leg defining an annular flow path therebetween; and
   a first electrical connector connected to said electrically conductive tubular member and a second electrical connector connected to said rod, said electrical connectors adapted to receive voltages of opposite polarity.

2. The ion generating device according to claim 1, wherein said one of said legs is tubular.

3. The ion generating device according to claim 2, wherein said rod and said tubular member are coaxial.

4. The ion generating device according to claim 3, wherein said rod is releasably retained in said tubular member by a quick disconnect coupling.

5. The ion generating device according to claim 4, said rod is an anode and said electrically conductive tubular member is a cathode.

6. The ion generating device according to claim 1, wherein said through flow leg is a straight though flow leg, and said diverting leg intersects said straight through flow leg at a right angle.

* * * * *